(12) United States Patent
Mozel et al.

(10) Patent No.: US 10,150,305 B2
(45) Date of Patent: Dec. 11, 2018

(54) PROCESS AND SYSTEM FOR CONTINUOUS INKJET PRINTING

(71) Applicant: Kornit Digital Ltd., Rosh HaAyin (IL)

(72) Inventors: Jacob Mozel, Kfar-Saba (IL); Asaf Lupo, Moshav Neve Yarak (IL)

(73) Assignee: Kornit Digital Ltd., Rosh HaAyin (IL)

( * ) Notice: Subject to any disclaimer, the term of this patent is extended or adjusted under 35 U.S.C. 154(b) by 0 days.

(21) Appl. No.: 15/327,046

(22) PCT Filed: Jul. 26, 2015

(86) PCT No.: PCT/IL2015/050766
§ 371 (c)(1),
(2) Date: Jan. 18, 2017

(87) PCT Pub. No.: WO2016/016884
PCT Pub. Date: Feb. 4, 2016

(65) Prior Publication Data
US 2017/0217213 A1    Aug. 3, 2017

Related U.S. Application Data

(60) Provisional application No. 62/031,312, filed on Jul. 31, 2014.

(51) Int. Cl.
*B41J 11/00* (2006.01)
*B41J 29/17* (2006.01)
(Continued)

(52) U.S. Cl.
CPC ........... *B41J 11/0015* (2013.01); *B41J 3/407* (2013.01); *B41J 3/4078* (2013.01); *B41J 29/17* (2013.01); *C09D 11/30* (2013.01); *C09D 11/40* (2013.01); *C09D 11/54* (2013.01); *C11D 1/02* (2013.01); *C11D 1/66* (2013.01); *C11D 1/72* (2013.01);
(Continued)

(58) Field of Classification Search
CPC .......... B41J 3/4078; B41J 29/17; C09D 11/54
See application file for complete search history.

(56) References Cited

U.S. PATENT DOCUMENTS 5,847,729 A * 12/1998 Takahashi ............. B41J 2/2103
346/139 A
5,972,876 A   10/1999 Robbins et al.
(Continued)

FOREIGN PATENT DOCUMENTS

WO    WO 2016/016884    2/2016

OTHER PUBLICATIONS

International Search Report and the Written Opinion dated Oct. 27, 2015 From the International Searching Authority Re. Application No. PCT/IL2015/050766.
(Continued)

*Primary Examiner* — John P Zimmermann

(57) ABSTRACT

A process for printing a coagulating ink composition directly on a substrate being supported by an adhesive surface, effected by cleaning the adhesive surface with a cleaning composition capable of removing residues of coagulated ink composition from the adhesive surface is provided, as well as a system for carrying out the process and a formulation for the cleaning composition. The cleaning composition comprises a weak organic base (preferably EDTA salts) and is characterized by a pH level of at least 7.5.

16 Claims, 1 Drawing Sheet

(51) Int. Cl.
*D06P 5/00* (2006.01)
*C11D 1/66* (2006.01)
*C11D 1/02* (2006.01)
*B41J 3/407* (2006.01)
*C11D 3/33* (2006.01)
*C09D 11/54* (2014.01)
*D06P 5/30* (2006.01)
*C11D 1/72* (2006.01)
*C09D 11/30* (2014.01)
*C09D 11/40* (2014.01)
*C11D 3/30* (2006.01)
*C11D 3/34* (2006.01)
*B65G 45/18* (2006.01)
*B65G 45/22* (2006.01)

(52) U.S. Cl.
CPC ............... *C11D 3/30* (2013.01); *C11D 3/33* (2013.01); *C11D 3/349* (2013.01); *D06P 5/00* (2013.01); *D06P 5/30* (2013.01); *B65G 45/18* (2013.01); *B65G 45/22* (2013.01)

(56) References Cited

U.S. PATENT DOCUMENTS

| | | | |
|---|---|---|---|
| 6,267,518 B1* | 7/2001 | Abe | B41J 3/4078 |
| | | | 347/3 |
| 6,511,152 B2 | 1/2003 | Yoshimura | |
| 2002/0165113 A1* | 11/2002 | Aehle | C11D 3/38636 |
| | | | 510/392 |
| 2005/0205835 A1 | 9/2005 | Tamboli et al. | |
| 2012/0268521 A1* | 10/2012 | Moribe | C09D 11/322 |
| | | | 347/21 |
| 2014/0036014 A1 | 2/2014 | Mozel et al. | |
| 2016/0222368 A1* | 8/2016 | Babe | A23K 20/189 |

OTHER PUBLICATIONS

ATR Chemicals "Washing Agent For Adhesives", ATR Chemicals SA, Remover NLP, ATR 1336, Technical Datasheet, May 21, 2008. p. 1.

Habasit "Printing Blankets Handling and Maintenance Instructions", Services Media 6036, Habasit Catalogue, 24 P., Nov. 14, 2010. p. 2, 21.

* cited by examiner

PROCESS AND SYSTEM FOR CONTINUOUS INKJET PRINTING

RELATED APPLICATIONS

This application is a National Phase of PCT Patent Application No. PCT/IL2015/050766 having International filing date of Jul. 26, 2015, which claims the benefit of priority under 35 USC § 119(e) of U.S. Provisional Patent Application No. 62/031,312 filed on Jul. 31, 2014. The contents of the above applications are all incorporated by reference as if fully set forth herein in their entirety.

FIELD AND BACKGROUND OF THE INVENTION

The present invention, in some embodiments thereof, relates to inkjet printing technologies, and more particularly, but not exclusively, to a process of inkjet printing on a continuous printing apparatus using a coagulating ink composition.

Digital printing is becoming the method of choice for many large-scale industrial manufacturers of colored design fabrics for the garment industry. This method allows a manufacturer to respond rapidly to the ever changing demands of the dynamic fashion market. Nonetheless, the use of digital printing is limited particularly when the demand of the fashion market grows in terms of a wider variety of fabrics (natural fiber, synthetic, stretch, etc.), a more demanding use for the product (wash fastness, "breathing", stretchability, etc.), a wider color gamut on lightly-, darkly-colored and/or stretchable fabric, and higher resolution designs.

The type of fabric and the use thereof determine the suitable type of digital ink. The inks that have been used most broadly for high color gamut, high durability and high resolution printing on industrial scale, at least until the recent years, have been dye-based digital inks, which are typically classified into acid, reactive and dispersed inks. One of the disadvantages of reactive dye-based inks is that they require the use of a fabric with a specific pre-treatment and the multi-step fixation process required per each type of ink, wherein acid and reactive inks require moist heat as in steaming for fixation, and dispersed dye inks require dry heat fixation. The advantage of the dye-based inks is the wider-achieves color gamut.

Digital pigment-based inks that typically do not require any pre-treatment or post-treatment. These inks are typically based on a suspension of micro- and nano-sized colored particles, suspended in a resin-based emulsion. While pigment-based digital inks provides for a reasonable color gamut, the color gamut achieved with such inks is not as wide as achieved with dye-based inks. Yet, the advantage of pigment-based digital inks is the ability to print onto the widest range of fabrics including cotton, silk, rayon, cotton/poly blends, and some polyester in a variety of weights, while no pre-treatment is necessary, allowing the acquisition of fabrics from any source and market.

In the recent years, a family of pigment-based digital inks, suitable for printing on any type of fabric, dark or light colored, absorptive and stretchable, have been developed and commercialized (see, for example, U.S. Patent Application Nos. 20040252173, 20070103528, 20070103529, 20070104899, 20110032304, 20120040148 and 20140036014, U.S. Pat. No. 7,134,749 and International Patent Application Nos. WO/2005/115089, WO/2005/115761 and WO/2011/018786), each of which being incorporated by reference as if fully set forth herein. These ink compositions are based on a chemical and/or physical property of the ink components, which can be selected so as to coagulate or precipitate upon contact with another substance on the surface of the substrate. This coagulate or precipitate, or otherwise immobilization of the ink droplet, afford several major achievements—the ink is not absorbed by the substrate in case of textile and other absorptive materials, hence there is very minimal penetration and crossing-over of ink into the fabric and its back-side; the droplets preserve their original size and shape of microscopic droplets by not spreading over and/or into the substrate, thereby affording a sharper image and better color definition; and the ink forms a film over the substrate which can be selected so as to be stretchable and breathing, allowing the formation of a digital image on a stretchable substrate without sacrificing any of the color image quality even after it has been pulled and stretched. This family of ink compositions transformed the garment industry by allowing the manufacturer to use any non-pretreated fabric at any scale, including in "roll-to-roll" printing machines (continuous substrate printing machines), while not sacrificing the color gamut and image resolution which have been previously achievable only by dye-based digital inks.

In some digital and non-digital printing systems, such as in a "roll-to-roll" printing systems, it is required that the fabric does not slip or deform during printing process in order to prevent loss of print definition. To that end, the fabric is held stretched and in controlled motion by being temporarily affixed to a flat support, which is typically made of a flexible water-proofed rubber-like material. The surface of the support which faces the fabric is made to be removably adhesive so as to afford the temporary affixation of the fabric to the support; hence, the support is typically referred to collectively as an adhesive blanket, a sticky conveyor belt, or a sticky blanket. The fabric is therefore usually temporarily affixed to the adhesive blanket, or stuck onto it with a solvent- or water-based polymeric resin/gum or a thermoplastic polymeric adhesive (removable adhesive). After printing, the fabric is separated from adhesive blanket, and the belt is washed to remove any fiber and ink residues transferred through the cloth or beyond its edges.

Typically, the polymeric coat loses its stickiness (tackiness) due to loose fibers released from the fabric during the printing process that cover the surface of the adhesive blanket, particularly when used to convey long stretches of fabric. This problem is solved by cleaning the blanket continuously during the printing process by means of an elongated brush dipped in a water basin and positioned underneath conveyor belt. The wet brushing releases the fibers from the adhesive layer, thereby renewing the capacity of the belt to affix the fabric.

However, while this water-based cleaning process of the adhesive blanket is effecting in removing loose fibers, it not effective when using a pigment-based ink composition that has the capacity to coagulate on the surface of the fabric, as some of the ink does make its way to the adhesive surface through the fabric, thus coating the blanket adhesive polymeric coat with a film of ink that is not removed when brushed with water. When the adhesive blanket is coated with a film made of coagulated ink residues, oily residues and loose fibers from the fabric, rendering it non-sticky, the operator of the printing machine is forced to remove the spent adhesive layer, typically using costly and sometimes hazardous organic solvents, and reapply a new adhesive layer. The process of reapplying an adhesive layer on the conveyor belt take a toll of human resources and other resources, and creates a long hold in the production process (downtime) at a great cost to the printed fabric manufacturer.

SUMMARY OF THE INVENTION

According to an aspect of some embodiments of the present invention there is provided a process of inkjet printing an image on a substrate or a portion of a substrate, the process comprising:

affixing the substrate or the portion of the substrate to an adhesive surface of a support;

inkjet printing the image by directly applying an ink composition onto the substrate or on the portion of the substrate;

separating the substrate from the adhesive surface; and contacting the adhesive surface with an aqueous cleaning composition having a pH level of at least 7.5.

According to some embodiments of the invention, the process further comprises, upon the contacting:

affixing another substrate or another portion of the substrate to the adhesive surface;

inkjet printing the image by directly applying an ink composition onto the another substrate or another portion of the substrate;

separating the another substrate or the another portion of the substrate from the adhesive surface; and re-contacting the adhesive surface with an aqueous cleaning composition having a pH level of at least 7.5.

According to some embodiments of the invention, the process further comprises, upon re-contacting, repeating the affixing, the inkjet printing and the separating, consecutively, for each substrate in a plurality of substrates or for each portion in a plurality of portions of the same substrate, wherein before each affixing, the adhesive surface is re-contacted with the cleaning composition.

According to some embodiments of the invention, the ink composition comprises a first part and a second part, whereas the first part includes a property-adjusting agent and the second part that includes an property-sensitive agent and a colorant, and whereas the second part congeals upon contact with the first part when the first part and the second part converge on the substrate.

According to some embodiments of the invention, the property-adjusting agent is an acid.

According to some embodiments of the invention, the property-sensitive agent is selected from the group consisting of an acrylate, an acrylic acid salt, an acrylic polymer salt and any combination thereof.

According to some embodiments of the invention, the cleaning composition has a pH level of at least 8.5.

According to some embodiments of the invention, the cleaning composition comprises a buffer agent.

According to some embodiments of the invention, the buffer agent is selected from the group consisting of 2-amino-methyl-1,3-propanediol (AMPD), 2-(bis(2-hydroxyethyl)amino)acetic acid (bicine), borate/boric acid, N-cyclohexyl-3-aminopropanesulfonic acid (CAPS), N-cyclohexyl-2-hydroxyl-3-aminopropanesulfonic acid (CAPSO), carbonate, N-cyclohexyl-2-aminoethanesulfonic acid (CHES), ethylenediaminetetraacetic acid (EDTA), glycine, glycylglycine (diglycine), 3-[[1,3-dihydroxy-2-(hydroxymethyl)propan-2-yl]amino]propane-1-sulfonic acid (TAPS), 2-aminoethanesulfonic acid (taurine; AES), 2-amino-2-hydroxymethyl-propane-1,3-diol (Tris), Tris/Borate/EDTA (TBE), and any salt and/or combination thereof.

According to some embodiments of the invention, the buffer agent is a combination of two or more salts of EDTA.

According to some embodiments of the invention, a concentration of the buffer agent ranges from 5 mM to 50 mM.

According to some embodiments of the invention, the cleaning composition further includes an anionic surfactant.

According to some embodiments of the invention, the cleaning composition further includes a nonionic surfactant.

According to some embodiments of the invention, the cleaning composition further includes a hardness-sequestering agent.

According to some embodiments of the invention, the cleaning composition further includes an additional ingredient selected from the group consisting of a cationic surfactant, a wetting agent, a thickener, an anti-foaming agent, a disinfecting agent, a fungicide, a bactericide and any combination thereof.

According to some embodiments of the invention, the process further comprises, subsequent to the contacting, or to the re-contacting the adhesive surface with the cleaning composition, re-adjusting the pH level to at least 7.5.

According to some embodiments of the invention, the process is effected by using a printing system for direct printing the ink composition on the substrate or the portion of the substrate, the printing system comprising:

a printing unit for applying the ink composition;

a support for supporting the substrate, having the adhesive surface; and a means for contacting the cleaning composition with the adhesive surface.

According to some embodiments of the invention, the printing unit comprises at least one first nozzle for applying a first part of the ink composition and at least one second nozzle for applying a second part of the ink composition, whereas the second part congeals upon contact with the first part when the first part and the second part converge on the substrate or the portion of the substrate.

According to some embodiments of the invention, the means for contacting is selected from the group consisting of a brush, a spraying nozzle and a sponge.

According to some embodiments of the invention, the system further comprises a basin for housing the means for contacting and/or for holding the cleaning composition.

According to some embodiments of the invention, the system further comprises a pH controller for monitoring and/or readjusting the pH level of the cleaning composition.

According to some embodiments of the invention, the system further comprises a buffer reservoir for holding a concentrated basic stock solution.

According to some embodiments of the invention, the system further comprises a circulator for circulating the cleaning composition.

According to some embodiments of the invention, the system further comprises a composition reservoir for holding the cleaning composition.

According to an aspect of some embodiments of the present invention there is provided a printing system for direct printing an ink composition on a substrate, comprising:

a printing unit for applying the ink composition;

a support for supporting the substrate, having an adhesive surface configured for affixing the substrate to the support;

an aqueous cleaning composition having a pH of at least 7.5; and a means for contacting the cleaning composition with the adhesive surface.

According to some embodiments of the invention, the ink composition comprises a first part and a second part, whereas the first part includes a property-adjusting agent and the second part that includes an property-sensitive agent and a colorant, and whereas the second part congeals upon contact with the first part when the first part and the second part converge on the substrate, thereby forming a congealed ink composition, and wherein the printing unit comprises at least one first nozzle configured for applying the first part of the ink composition and at least one second nozzle for applying the second part of the ink composition.

According to some embodiments of the invention, the property-adjusting agent is an acid.

According to some embodiments of the invention, the property-sensitive agent is selected from the group consisting of an acrylate, an acrylic acid salt, an acrylic polymer salt and any combination thereof.

According to some embodiments of the invention, the cleaning composition has a pH level of at least 8.5.

According to some embodiments of the invention, the cleaning composition comprises a buffer agent.

According to some embodiments of the invention, the buffer agent is selected from the group consisting of 2-amino-methyl-1,3-propanediol (AMPD), 2-(bis(2-hydroxyethyl)amino)acetic acid (bicine), borate/boric acid, N-cyclohexyl-3-aminopropanesulfonic acid (CAPS), N-cyclohexyl-2-hydroxyl-3-aminopropanesulfonic acid (CAPSO), carbonate, N-cyclohexyl-2-aminoethanesulfonic acid (CHES), ethylenediaminetetraacetic acid (EDTA), glycine, glycylglycine (diglycine), 3-[[1,3-dihydroxy-2-(hydroxymethyl)propan-2-yl]amino]propane-1-sulfonic acid (TAPS), 2-aminoethanesulfonic acid (taurine; AES), 2-amino-2-hydroxymethyl-propane-1,3-diol (Tris), Tris/Borate/EDTA (TBE), and any salt and/or combination thereof.

According to some embodiments of the invention, the buffer agent is a combination of two or more salts of EDTA.

According to some embodiments of the invention, the concentration of the buffer agent ranges from 50 mM to 500 mM.

According to some embodiments of the invention, the cleaning composition further comprises an additional ingredient selected from the group consisting of a surfactant, a wetting agent, a thickener, an anti-foaming agent, a disinfecting agent, a fungicide, a bactericide and any combination thereof.

According to some embodiments of the invention, the means for contacting is selected from the group consisting of a brush, a spraying nozzle and a sponge.

According to some embodiments of the invention, the system further comprises a basin for housing the mean for contacting and/or for holding the cleaning composition.

According to some embodiments of the invention, the system further comprises a pH controller for readjusting the pH level of the cleaning composition.

According to some embodiments of the invention, the system further comprises a buffer reservoir for holding a concentrated basic stock solution.

According to some embodiments of the invention, the system further comprises a circulator for circulating the cleaning composition.

According to some embodiments of the invention, the system further comprises a composition reservoir for holding the cleaning composition.

According to an aspect of some embodiments of the present invention there is provided a cleaning composition for removing a residue of a congealed ink composition from a surface of an object, the composition comprising an organic base, a protonated form of the organic base, an anionic surfactant, a nonionic surfactant, a cationic surfactant, a hardness-sequestering agent, an anti-foaming agent, a fungicide, a wetting agent and water, wherein a pH level of the composition is at least 7.5.

According to some embodiments of the invention, the surface is an adhesive surface.

According to some embodiments of the invention, the object is an adhesive support usable in a printing system.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
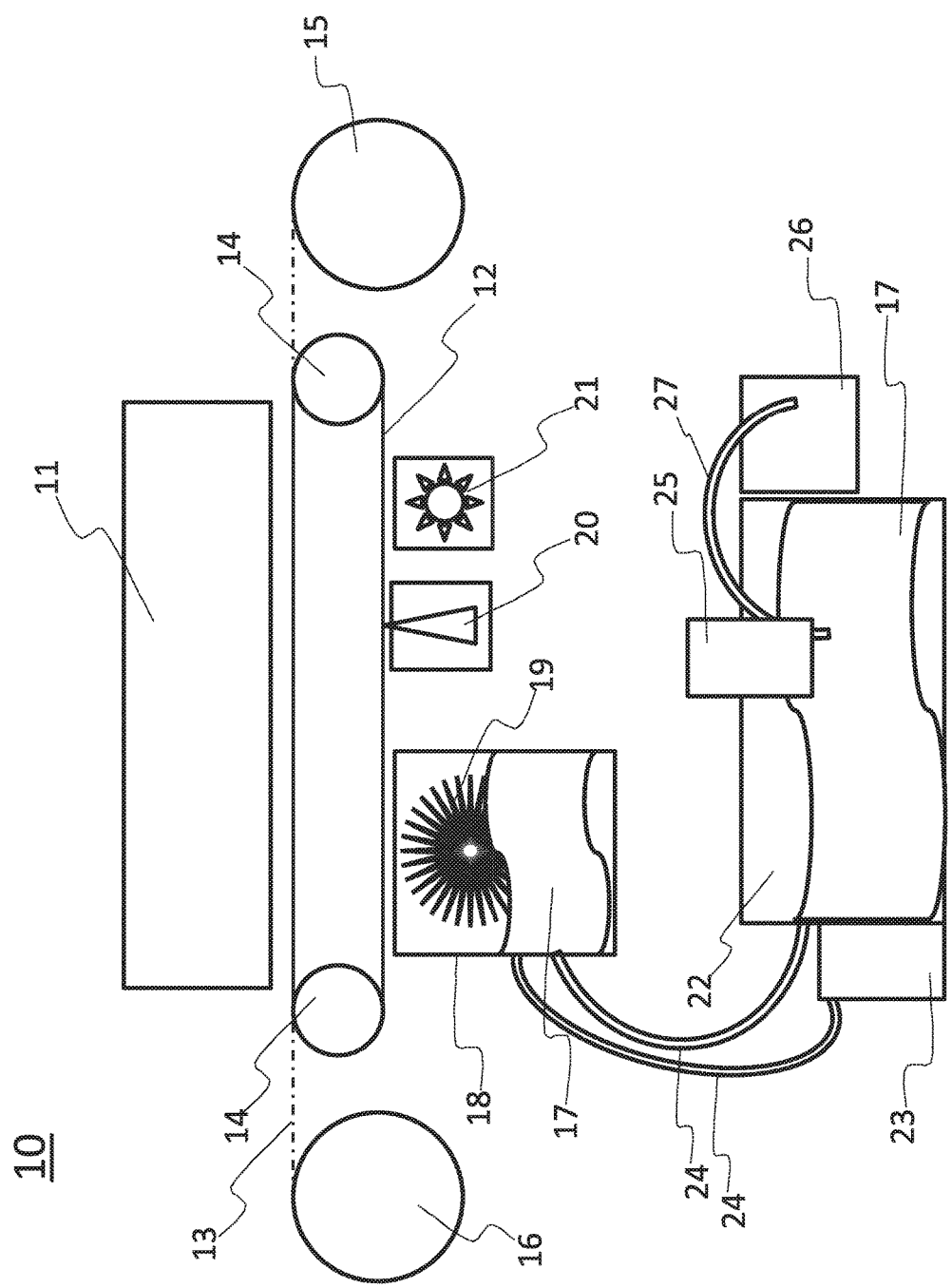
FIG. 1 is a schematic illustration of an exemplary printing system, according to some embodiments of the present invention.

The present invention, in some embodiments thereof, relates to inkjet printing technologies, and more particularly, but not exclusively, to a process of inkjet printing on a continuous printing apparatus using a coagulating ink composition.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have devised a process, a system and a cleaning composition, usable in inkjet printing methodologies in which congealing ink compositions are used, and are aimed at solving the problems associated with such methodologies, such as described in further detail hereinafter.

As described hereinabove, the growing use of digital inkjet processes for industrial-scale printing on fabric, and particularly the growing use of pigment-based ink compositions capable of coagulating on the surface of the substrate upon combining two or more parts of the ink composition, created a problem to recondition the adhesive conveyor belt used in some printing apparati, such as a roll-to-roll printing systems.

While searching for a solution to the problem of forming a film of coagulated ink on the adhesive surface of the substrate's support (adhesive blanket), as used in roll-to-roll printing machines, the present inventor has contemplated a chemical reaction that could reverse the coagulation reaction which occurs when the various parts of the ink composition are combined. A chemical reaction that can remobilize the ink droplets would allow the ink film to be washed away using essentially the same cleaning device described herein. Since the ink composition typically congeals as a result of contacting a colored ink part or composition, comprising, for example, an acid-sensitive pigment suspension, with an immobilization part comprising an acidity adjusting agent (e.g., an acid), the present inventors have designed a printing process and system utilizing a basic (high pH) cleaning composition to refresh the stickiness of the adhesive blanket in, for example, a roll-to-roll printing system.

While reducing the invention to practice, it was found that water insoluble residues, stemming from materials that are used for coating the fabric's threads, used for fabric finishing (such as softeners) also accumulate on the adhesive surface of the adhesive blanket and contribute to the clogging of the adhesive blanket. Surprisingly, it was found that these hydrophobic (oily) residues could also be removed from adhesive blanket using the method, apparatus and composition provided herein.

Congealing Ink Composition:

As discussed hereinabove, while some ink compositions can be washed off by water prior to curing, other ink compositions, particularly those used by high-end manufacturers which seek to produce high-resolution, high-gamut, durable yet soft and stretchable and wash-fasten inkjet printing on textile, are designed to coagulate on the substrate upon printing, thereby bestowing the abovementioned qualities of the finished product. According to some embodiments, such inkjet compositions can include at least a first composition (also referred to herein as a first part) and a second composition (also referred to herein as a second part), wherein the first composition comprises an emulsified property-adjusting agent and a first carrier, and the second composition comprises a property-sensitive agent, a colorant and a second carrier, whereas the second composition congeals or coagulates upon contact with the property-adjusting agent. Such inkjet compositions, and/or parts thereof, according to embodiments of the present invention, are formulated for forming an image in a form of a film attached to a surface of a substrate. In some embodiments, the ink composition is formulated to form an elastic film on the surface of the substrate, which is advantageous when printing on absorptive, stretchable and/or flexible substrates, such as textile. Once all the parts of such an ink composition (or all compositions used for forming the final ink composition that forms a printed image) converge on the substrate and the printing process is complete, a thin film, which constitutes the image, is formed on the substrate. In some embodiments of the invention, the image is formed as an elastic film, an attribute which refers to the mechanical property and form of the image, as it is formed on the substrate from a polymerizable ink composition. This film is said to be elastic since it is formed substantially from elastomeric substances.

It is noted that the film, according to some embodiments of the present invention, is at least as elastic as the substrate it is affixed to.

In order to obtain a sharp and vivid image in the form of a film, the film should be made from fine and distinct points of colors, which may be compared to pixels of a digital image or the grain of a photographic paper coated with light-sensitive chemicals. The distinct points of colors stem from very fine droplets of colored ink which are jetted onto the substrate during the printing process, and the finer the droplets remain on the substrate after ejection, the finer the image would be. The droplets will remain fine if feathering, bleeding and smearing can be limited. The way to afford a sharp image film on the substrate is to "freeze" or immobilize the droplets on contact with the substrate. Thus, a chemical and/or physical change takes effect in the ink composition upon contacting thereof with the substrate, and this chemical and/or physical change is effected by combining agents in the composition, and/or in parts thereof, which are designed to afford the immobilization of the inkjet droplets on the substrate, eventually leading to better and sharper images. It is noted that this immobilization of the inkjet droplets on the substrate is unrelated to the type of substrate, and does not depend on nor require any pretreatment of the substrate.

The term "immobilization", as used in the context of embodiments of the present invention, refers to the act of restriction or substantial limitation of flowability of a liquid, namely substantial reduction of the capability of a liquid to move by flow. For example, immobilization of a liquid can be effected by congelation of the liquid or solutes therein. Immobilization of droplets of liquid ink can be achieved, for example, by elevating the viscosity of the liquid ink composition such that the droplets are restricted from flowing once in contact with the substrate. As used herein, the term "immobilization" is not meant to include final polymerization and print fixation by crosslinking and curing reactions.

Hence the chemical and/or physical change, according to some embodiments of the present invention, is congelation. The term "congelation", as used herein, is synonymous to the terms "coagulation", "thickening" or "gelation", and refer to the sharp decrease in fluidity of a formerly fluid liquid. Congelation can be effected also by sedimentation, precipitation, partial solidification and partial polymerization of soluble constituents in the composition.

According to some embodiments of the present invention, the inkjet compositions include an emulsified film-forming agent that can congeal on a substrate controllably so as to avoid bleeding of the ink composition. The ink composition then further polymerizes during drying/curing on the surface of the substrate without being absorbed therein, and becomes affixed to the substrate, thereby affording an image in the form of a flexible film, which can stay pliable and extendable as the stretchable substrate at normal temperatures of everyday life.

In order to effect congelation upon contact with the substrate and not before, the ink composition is formed from at least two separate parts or compositions which combine only upon contact with the substrate. The two parts or compositions cross-react with each other since one part contains a property-sensitive agent and the other contains a property-adjusting agent, and the cross-reaction between the two parts or compositions effects the congelation. In general, the objective of using an ink composition containing a property-sensitive agent in one part or composition and a property-adjusting agent in a separate part or composition, is to provide the means to congeal and thereby immobilize the final ink composition only on the surface of the substrate and not beforehand, thus avoiding clogging of the delicate elements of the printheads. The property-adjusting agent is selected such that it effects a change in the property-sensitive agent only upon allowing contact therebetween, and thereby effects congelation in the combined, final ink composition.

The term "property-sensitive" refers to a component of a composition which is sensitive to a change in a particular chemical and/or physical property of the composition and as a result of such a change undergoes a chemical and/or physical change which effects the entire composition. Such sensitivity can manifest itself by, for example, the loss of its ability to stay as an emulsion, an event that leads to congelation.

The term "property" as used herein refers to a chemical and/or physical property of the ink composition, namely, a characteristic of the composition that is reflected by the chemical composition and/or a physical parameter of the composition. Representative examples include, without limitation, acidity (pH), metal atom complexation, dispensability, dispersibility, solubility, ionic strength, hydrophobicity, electric charge and the likes.

The term "pH" refers to the quantitative measure of the acidity or alkalinity (basicity) of liquid solutions. It is noted that some property-sensitive film-forming agents become pH-sensitive only in the presence of certain metal oxides.

It is noted that some film-forming agents will be stable in various conditions, such as low pH, but will congeal if a certain metal oxide is present in the emulsion. Hence according to some embodiments of the present invention, the second part of the ink composition further includes a metal oxide.

The phrase "metal ion complexation", as used herein, refers to the ability of some functional groups in certain substances, to act as ligands which bind to some metal atoms in a coordinative manner so as to form a metal-ligand complex. Such complexation may alter the chemical characteristics of these substances and render them more or less susceptible to chemical changes in their environment. It is noted that some property-sensitive film-forming agents are sensitive to this property without the need of a change in the pH of the medium.

The phrase "ionic strength" as used herein refers to the charge-weighted concentration of ions in solutions.

The term "hydrophobicity" as used herein refers to a quality of a non-polar molecule or group that has little affinity to water or other polar solvents. Hydrophobic groups on molecules in a polar solution tend to turn in on them or clump together with other hydrophobic groups.

The term "dispersibility" as used herein refers to the amount of a dispersed or emulsified species that will disperse in a specific carrier under given conditions. The reduction of dispersibility may be effected by a change in another chemical property such as pH, ionic strength, hydrophobicity or otherwise causing collapse of the dispersion or emulsion.

The aforementioned properties may be inter-dependent, namely a change in one property effects a change in another property, thereby constituting inter-dependency therebetween. An example of such inter-dependency is a pH-dependent dispersibility and ionic-strength-dependent dispersibility, wherein the change in pH (the aforementioned acidity or alkalinity property) or the ionic-strength of a solution changes the dispersibility of one or more of its dispersed species.

Similarly, there exist inter-dependency between metal ion complexation combined with pH, and the capacity to stay emulsified (dispersed), and such interdependency is discussed in detailed hereinbelow.

The phrase "property-adjusting agent" as used herein refers to a component in a part of an ink composition and can effect the level of one or more chemical or physical properties of other parts of the composition when these compatible parts come in contact and combine, such as a pH level, metal-ion-ligand complexation, dispersibility, the ionic strength, the hydrophobicity or the electric charge/valency of the combined composition. By effecting a change in one or more such properties, the property-adjusting agent is causing the property-sensitive agent to undergo congelation, as discussed herein.

According to some embodiments of the present invention, the first part or composition of an ink composition as described herein is formulated with a first carrier (solvent) and used to carry and deliver a property-adjusting agent, and does not contain a colorant and is thus substantially transparent and colorless, and intended not to leave a distinguishable mark on the substrate. It is the property-adjusting agent that affects a property-sensitive agent in a second color-containing part or composition and other optional parts of, or compositions composing, the final ink composition, thereby effecting congelation of the combined parts or compositions. Hence, the first part or composition of the ink composition, which includes a property-adjusting agent, is also referred to herein interchangeably as the immobilization part or composition. The second part of, or composition composing, the ink composition, comprises a colorant, a second carrier and a property-sensitive agent in the form of, for example, an emulsified resin, which will congeal on the surface of the substrate due to an interaction between the parts (e.g., an interaction induced by the property-adjusting agent).

According to some embodiments of the present invention, the property-sensitive agent can be a film-forming polymerizable agent, which is soluble/dispersible/emulsifiable when present in the ink composition and may also act as a dispersing agent for the various pigment colorants which are included in some parts of the ink composition. This pigment dispersing agent, can be the property-sensitive agent that congeals when, for example, a transition metal oxide is added and/or the pH or the ionic strength of the media it is dissolved in crosses a certain level. Hence, according to some embodiments of the present invention, the film-forming attribute and the property-sensitive attribute are combined in a dispersant of pigments and other colorants. However, it is noted that the property-sensitive agent is not required to disperse the pigment or be associated thereto in any form other than being present in the same part of the ink composition.

A typical colorant in inkjet ink compositions is a dispersed pigment. As found by the present inventors, the property-sensitive agent according to embodiments of the present invention, is not necessarily involved with the colorant, may it be a dispersed pigment, a dissolved dye or combinations thereof. Therefore this property-sensitive agent can serve its purpose in the context of embodiments of the present invention without reference to the colorant, as opposed to some ink compositions known in the art, where the colorant in a dispersed pigment and the pigment's dispersant is sensitive to pH or other effectors. For example, according to some embodiments of the present invention, such dispersants are acrylic salts (salts of an acrylic acid monomer), which lose their dispersing attribute and become immiscible or insoluble as a result of a pH-shift, and precipitates.

For example, a property-sensitive agent, such as a pH/metal-ion-sensitive acrylic polymer or copolymer, can lose its ability to stay in an emulsified form, possibly due to formation of metal-complexation species when the pH of the liquid formulation drops below a certain level and/or when a certain metal ion or metal oxide is introduced, thus effecting congelation of the combined ink composition and in practice effects the immobilization of the colorant which is present therein. Hence, according to some embodiments, the property-sensitive agent does not serve as a dispersant for the pigments, but rather affects the dispersability of the pigments in an indirect fashion by congealing and thus immobilizing the pigments as well.

The basic process colorants in liquid ink compositions are required to be transparent or translucent, since only a few (typically 3-8) basic colors are used and the full spectrum of colors and shades is achieved when these basic colors are perceived by the eye as mixed in various combinations on the substrate. However, direct printing of multicolor images using transparent inks on any surface requires the surface, which is the background of the image, to be white or at least lightly-colored, since its inherent color participates in the formation of the final perceived color, together with the colorant in the inks applied thereon. Surfaces of darkly colored or non-white substrates tend to render the primary-colored ink drops indistinguishable or substantially color-skewed since the final perceived color stemming from any combination of the primary colors is a subtraction of that particular combination from the color white, or at least from a bright light color. It is therefore a physical requirement that the background of an image generated directly onto a surface be a bright light color or white.

To overcome the problem of printing on a non-white substrate, an opaque white underbase layer is printed on the substrate before the translucent colored part (second part) is printed. This opaque underbase layer is afforded by a third part or composition, which combines with the first, second or other parts or compositions to form of the printed image, according to some embodiments of the present invention.

According to some embodiments, the ink composition further includes a third part or a third composition, which comprises an emulsified property-sensitive proto-elastomeric film-forming agent, an opaque colorant in the form of a second metal oxide, as this phrase is defined hereinbelow, and a third carrier.

The third part or composition therefore includes an opaque and lightly-colored pigment colorant. It is noted that the opaque and lightly-colored opaque pigment colorant is white, affording an opaque white layer when jetted on a darkly-colored or non-white surface. It is further noted that the white opaque pigment is suitable-sized particles of a second metal oxide, such as, for example, titania.

It is further noted that the ink composition, according to some embodiments of the present invention, is suitable for inkjet printing of "spot" colorants, which are substantially opaque colored inks. Spot colorant can be jetted like any other transparent "process" colorants, and are typically used to generate special effects in order to afford highlights and emphases over the image usually in pre-defined coloration.

According to some embodiments of the present invention, a fourth part or a fourth composition, which comprises an emulsified property-sensitive agent, a second metal oxide which is substantially opaque, a colorant and a fourth carrier, is combined with other compositions or parts, as described herein, into the final ink composition that forms the printed image.

The table below presents the various parts or compositions composing the ink composition which forms a printed image, according to some embodiments of the present invention, and lists their alternative names used herein, their function and some of their principle ingredients. It is noted that the wetting composition, which is discussed in details hereinbelow in the context of a process for printing the image, may be regarded as another part of the composition albeit it is not necessarily applied on the substrate by digital means or an inkjet printhead.

Table 1 below presents an exemplary ink composition, describing some of the names, properties, functions and ingredients of each part of thereof.

TABLE 1

| Term in claims | Alternative term and characteristics | Function | Some of the principal ingredients |
| --- | --- | --- | --- |
| Wetting composition | Typically applied by massive spraying and can further be manipulated mechanically by squeegee or roller | To flatten protruding fibers, smooth and even the surface before fine droplets are printed thereon | Water |
| First part | Immobilization part; Generally transparent/colorless; Typically printed before or concurrently with the other parts and after the wetting composition | Provides the property-adjusting agent, namely the constituent that causes the ink part that contains the property-sensitive agent to congeal on contact Optionally provides some of the proto-elastomeric film forming agent(s) | A property-adjusting agent (e.g. an acid); A carrier (e.g. water); An optional polymerizable resin (e.g. an acrylic mixture) |
| Second part | Colored part; Translucent color part; Generally transparent and colored by CMYK basic colors; Typically printed after and over the first part | Provides the colorants for the design/image which are dispersed in a property-sensitive dispersant that congeals upon contact with the first part; May include some proto-elastomeric film | A dispersed translucent colorant; A carrier (e.g. water); A property-sensitive polymerizable dispersant (e.g. an acrylate); An optional additional polymerizable resin (e.g. an acrylic mixture); |

TABLE 1-continued

| Term in claims | Alternative term and characteristics | Function | Some of the principal ingredients |
|---|---|---|---|
| | | forming agent(s) | A polymerization catalyst; A crosslinking agent; |
| Third part | Underbase part; Opaque white part; Generally opaque and white; Typically printed after and over the first part and before the second part. | Provides a solid opaque white background to the translucent colors when printed on a non-white substrate; May include some proto-elastomeric film forming agent(s) | A dispersed opaque colorant (e.g. a metal oxide); A carrier (e.g. water); A property-sensitive polymerizable dispersant (e.g. an acrylate); An optional additional polymerizable resin (e.g. an acrylic mixture); A polymerization catalyst; A crosslinking agent; |
| Fourth part | Spot color part; Opaque colored part; Typically printed after and over the second part | Provides a "non-process" solid opaque colored highlights of color over the design/image; May include some proto-elastomeric film forming agent(s) | A dispersed opaque colorant (e.g. a metal oxide); A dispersed translucent colorant; A carrier (e.g. water); A property-sensitive polymerizable dispersant (e.g. an acrylate); An optional additional polymerizable resin (e.g. an acrylic mixture); A polymerization catalyst; A crosslinking agent; |

The action of immobilization by congelation of the ink composition is effected upon the abovementioned chemical or physical property change caused by the property-adjusting agent that is delivered concomitantly with the property-sensitive agent. Hence, at minimum, an ink composition may comprise at least a first part (an immobilization part) and a second part (a colored part), whereas the second part congeals upon contact with the first part when the first part and the second part converge on the substrate during the direct ink application (printing) process. This instant immobilization by congelation of the jetted droplets subsequently promotes improved color and detail resolution of the image, as well as improved contact between the colorant(s) in the ink composition and the substrate, which is effected by better adhesion of the medium containing the colorant (pigment and/or dye) therein to the substrate.

The binding and adhesion of the medium containing the colorant may be effected by, for example, direct heat-activated chemical crosslinking or entanglement of the proto-elastomeric polymerizable components in the ink composition with functional groups in the substrate.

In general, the content of the various parts of, or compositions forming, the final ink composition which forms the printed image, according to embodiments of the present invention, may vary according to the type of substrate and the specific requirements of the final printed product, yet each serve the same principles as follows. The carrier is selected to provide a medium for mixing, suspending and/or dissolving the other components of the ink composition, and is required to be volatile and benign. The colorant is selected to achieve the desirable color and other physical and chemical properties, and be suitable for a given printing machine, printheads and printing technology. The various proto-elastomeric film-forming binders and adhesion promoting agents as well as their activating and catalyzing counterparts, when needed, are selected so as to afford the adhesion of the colorants to the surface of the substrate in a substantially irreversible manner, at least in the sense of normal use of the final product as well as capable of forming an elastic film, and therefore should provide sustainability, stretchability and flexibility of the image on the product in wash, dry and reasonable wear and tear.

According to some embodiments of any aspect and embodiment of the present invention, the process, composition and system presented herein are effective and useful also for continuous or discrete substrates that have been pretreated with a property-adjusting agent or a property-sensitive agent in a separate process, that takes place before the direct printing process has begun. The pretreated substrate may be still wet by a composition comprising the property-adjusting agent or the property-sensitive agent, for wet on wet application, or pre-dried prior to loading the substrate onto the printing machine.

The inkjet ink composition according to some embodiments of the present invention, are formulated so as to be suitable for use in an inkjet printing process, including continuous printing processes wherein the substrate is provided as a very long (tens, hundreds and thousands of meter long) continuous sheet. Some of these printing processes are referred to herein and in the art as roll-to-roll printing, and such roll-to-roll printing processes are typically based on the use of an adhesive blanket in the form of an adhesive conveyor belt to affix and convey the substrate through the printing system during the printing process.

According to some embodiments, the ink composition is a congealing ink composition, namely an ink composition that loses its fluidity upon contact between various components or parts thereof.

According to some embodiments, the continuous substrate is a semi-permeable substrate which allows some of the ink composition to pass therethough and reach the adhesive blanket supporting and affixing the substrate during the printing process.

Adhesive Surface:

As described hereinabove, a support for a substrate, made in the form of a conveyor belt or a flat plane, and having an adhesive surface for affixing the substrate thereto during the printing process is also referred to herein as an adhesive blanket. A typical adhesive blanket, which is used also as a conveyor belt, may a perforated (mesh) or imperforated, flat and elastic band made as a closed belt (continuous) at a variable length (diameter), depending on the path of the belt in the printing system, and a fixed width that matches the printing area of the printing system.

In the context of embodiments of the present invention, the terms "adhesive blanket" and adhesive conveyor belt" are used interchangeably throughout the description of the present invention. It is to be understood that embodiments of the present invention refer to the adhesive surface of the adhesive blanket, the adhesive conveyor belt, or in general the substrate's support that comes in contact with the substrate, regardless of the shape of the support or a driving mechanism associated therewith. An adhesive blanket as described herein is also referred to herein and in the art as "sticky back blanket", "sticky blanket" and the likes.

As discussed hereinabove, in order for the substrate (e.g., a textile fabric) to be kept in place, stretched and flat throughout the printing process, the surface of the substrate's support which comes in contact with the substrate, is coated with an adhesive substance, or "adhesive blanket", which is typically a polymeric formulation, that is applied as a liquid on the surface of the belt (the side that comes in contact with the substrate), which once dried, form a polymeric adhesive layer which can affix the substrate at least temporarily and reversibly over and over again. The polymeric adhesive layer is typically a removable adhesive having a low Tg so as to remain adhesive enough to immobilize the fabric while allowing it to be easily separated and detached therefrom at the end of the printing process. Removable adhesives are designed to form a temporary bond, and ideally the adherents can be removed or separated after extended periods of time.

The removable adhesive, or blanket adhesive, can be a solvent based or a water based substance. Solvent based removable adhesive is a thermoplastic textile adhesive suitable for the coating of textile substrate support. Such adhesives are particularly used for bonding cotton and blended fabrics onto automatic printing machines with a support made of nitrile rubber, polyurethane or similar materials. Water based removable adhesive is an aqueous dispersion used for bonding textiles to automatic printing machines, printing tables and sample printing tables with substrate's support made of, e.g., nitrile rubber or polyurethane. Due to bonding properties, these permanent adhesives are highly suitable for cotton, cotton mixtures and synthetics. An example of a commercially available removable adhesive, suitable for printing applications, is KIWOTEX DK 66 D, which is frequently used for coating the substrate support and form the adhesive surface needed in some continuous printing processes.

The need to affix a substrate onto a support medium during a printing process is present in almost all printing processes, as a shifting substrate will ultimately cause an image to distort in terms of shape, resolution and color. In some printing machines, particularly those that are intended for printing on non-continuous (discrete) substrates, such as single garments and other discrete objects, the substrate may be held by a rigid frame or pins, or be affixed to a support having an adhesive surface, according to embodiments of the present invention.

In an industrial setting, it is preferable that an adhesive blanket would stay sticky for as long as possible, thus allowing continuous roll-to-roll printing tasks to run for at least until the machines are brought to a scheduled halt. For example, it is advantageous that the adhesive blanket remain usable without having to stop the machine for unscheduled maintenance thereof for up to six months at three work-shifts schedule, or up to a month, or up to a week of continuous use of the printing system.

Process:

According to some embodiments of the present invention, the ink composition which is used in the printing process congeals upon contact between the various parts of, or composition composing, the composition which forms the image. As discussed hereinabove, the congelation process is caused by chemical integrations that can be controlled, for example, by pH, and more specifically, chemical integrations which are effected by contacting an acidic part or composition, also referred to herein as an immobilization part or composition, with one or more of colored parts of, or compositions composing, the final ink composition that forms the printed image. The result of this acidity-controlled chemical interaction is a coagulated droplet or a film made of a plurality of such droplets, which can stick to the adhesive blanket and which cannot be removed by aqueous solutions having a neutral to low pH.

According to an aspect of some embodiment of the present invention, a cleaning composition which can be effectively used to remove droplets or a film of the coagulated ink composition, from an adhesive support during a printing process, is utilized. According to an aspect of some embodiments of the present invention, there is provided a process for printing an ink composition on a discrete substrate supported on a support having an adhesive surface.

According to some embodiments of the invention, the process comprising:

affixing a (first) substrate or a (first) portion of a substrate to a support having an adhesive surface (e.g., as described herein, in any of the respective embodiments), so as to temporarily affix said substrate to the support;

inkjet printing the image by applying the ink composition (e.g., as described herein, in any one of the respective embodiments and any combinations thereof) directly onto the supported substrate or portion thereof;

separating the substrate or the portion of the substrate from the support; and contacting the adhesive surface with an aqueous cleaning composition having a pH level that is higher than 7.5.

According to some embodiments of the invention, the process further comprises, subsequent to contacting the adhesive surface with the cleaning composition:

affixing another (second) substrate or another (second) portion of the substrate to the adhesive surface;

inkjet printing the image by directly applying the ink composition onto the another substrate or another portion of the substrate;

separating the another substrate or the another portion of the substrate from the adhesive surface; and re-contacting said adhesive surface with an aqueous cleaning composition having a pH level of at least 7.5.

The process may be repeated, for a plurality of substrates or plurality of portions of substrates (first, second, third, fourth, and so forth), by repeating said affixing, said inkjet printing and said separating, consecutively, for each substrate in the plurality of substrates or for each portion in the plurality of portions of the same substrate, wherein before each affixing, the adhesive surface is re-contacted with the cleaning composition.

In the above aspect of some embodiments of the present invention, the process can be fully automated or semi-automated (some steps, such as affixing and separating the substrates executed manually). The need to clean the adhesive surface may depend on the type of substrate, the ink application and the printing frequency/load. In any event, the adhesive surface can be contacted (cleaned) using the cleaning composition, according to embodiments of the present invention, between any two substrates or portions thereof, referred to herein also as the first and second substrate.

The need to affix a continuous substrate onto a support medium during a printing process is even more essential, as the printing process extends a substantially longer time than a printing process of a discrete substrate and is typically governed more automatically, presenting more possibilities for the substrate to shift and misalign. Due to the length of the substrate and the extended duration of the printing process, an event of smothered adhesive surface is more likely to occur during an extended use of the printing machine.

The term "substrate", as used herein, refers to an object on which an image is formed during the printing process. In some embodiments, the substrate is a piece of textile. In some embodiments, the substrate is a continuous substrate, typically used in "roll-to-roll" printing processes. Typically, a roll-to-roll printing process is effected on a portion of a continuous substrate, while other portions of the substrate are either before printing an image thereon or after having an image printed thereon. In the context of embodiments of the present invention, the portion of the substrate which is being printed on at any given time during the printing process, is the portion which is required to be affixed to a support.

Hence, according to an aspect of embodiments of the present invention, there is provided a process for printing an ink composition on a continuous substrate supported on a support having an adhesive surface (i.e., an adhesive blanket); the process is carried out by:

affixing a first portion of the substrate to the adhesive surface (e.g., as described herein), so as to temporarily affix the substrate to the support;

inkjet printing an image by directly applying an ink composition (e.g., as described herein, in any one of the respective embodiments and any combinations thereof) onto the first portion of the substrate;

separating that first portion of the substrate from the adhesive surface of the support;

contacting the adhesive surface of the support with an aqueous cleaning composition having a pH level that is higher than 7.5; and affixing a second portion of the substrate to the adhesive surface so as to temporarily affix the substrate to the support.

It is noted herein that in some embodiments, the first and the second portions of the substrate are consecutive portions of the substrate, however, in some embodiments of the invention, the first portion of the substrate is any portion thereof, and the second portion of the substrate is any other portion of the substrate (another portion of the substrate).

According to some of any of the embodiments described herein, the pH of the cleaning composition is higher than 8.5, higher than 9 or higher than 9.5.

The printing process, according to some embodiments of the present invention, may include additional steps of mounting the substrate (or a portion of the substrate) onto the printing system, either as a roll or in any other format, initializing the printing process by various standard optimizations, priming and adjustment steps, and affixing the lead part of the substrate (or a portion of a substrate) onto a fresh or clean adhesive surface of the substrate's support (i.e., an adhesive blanket).

The next steps may include any one of drying, curing and finally rewinding the substrate (or a portion of the substrate) on a rewinding roll, and test printing of the image or pattern so as to allow the printing parameters to be optimized and checked.

Once the system is ready, the continuous printing commences wherein a first portion of the substrate is continuously unwinded from the source roll, affixed to the adhesive blanket, printed upon, detached for the adhesive blanket, cured and rewinded on the collecting roll. This part of the process is then repeated continuously by affixing another portion of the substrate, referred to herein as a second portion of the substrate, on the adhesive blanket, printing thereon, separating this second portion from the adhesive blanket. The second portion is then followed by a third portion, which is followed by a fourth portion and so on, until the entire substrate is printed or otherwise used up.

During the continuous printing process, the part of the adhesive blanket, or in the case of a continuous printing systems—the adhesive conveyor belt, which has just been separated from the printed portion of the substrate, is brought in contact with the cleaning composition, according to embodiments of the present invention, and the loose fibers, mixed with oily (hydrophobic) residues from the fabric and residues of the congealed ink composition, are washed off the adhesive surface of the conveyor belt. This step takes place after separation of the printed substrate from the adhesive surface of the conveyor belt (the substrate's support), typically underneath the printing area, where the adhesive surface of the conveyor belt is facing downwards, thereby allowing the cleaning composition to be applied thereon while excess cleaning composition can be collected easily into a basin positioned under the composition application mechanism in the system.

According to some embodiments of the invention, treating the adhesive blanket using the presently disclosed process and composition continuously throughout a continuous printing task, as described herein, is advantageous since it allows the adhesive surface to be cleaned before too much residue and fibers have accumulated thereon. However, it is contemplated within the scope of some embodiments of the present invention to treat the adhesive surface periodically, at pre-determined periods of time throughout a continuous printing task without stopping the printing task.

Alternatively or additionally, it is contemplated within the scope of some embodiments of the present invention to treat the adhesive surface on demand, when indicators signal that the stickiness of the surface goes below an acceptable level, as assessed throughout a continuous printing task and without stopping the printing task. For example, according to some embodiments of the invention, optionally and additionally to the use of the cleaning composition continuously, the adhesive blanket is periodically washed manually, semi-automatically or fully-automatically with a cleaning composition having a higher concentration of surfactants (about 40% higher, compared to the mechanism-applied cleaning composition used continuously throughout the printing process). This periodic treatment is fast and effective in refreshing the adhesive blanket, particularly in comparison to the removal and complete replacement of the sticky layer on the adhesive blanket.

According to some embodiments, the composition application mechanism may comprise a cylindrical roller brush, which extends the width of the conveyor belt so as to eventually contact the entire surface of the support with the cleaning composition. A cylindrical roller brush, according to embodiments of the present invention, may have a helical construction having several helically formed strip brushes, or have a spirally wound construction, using spirally wound, strip brush fitted to a core.

Alternatively, the composition application mechanism may comprise a series of nozzle that spray the cleaning composition on the adhesive surface of the support. In such embodiments, the nozzles are configured to spray the cleaning composition at a strong enough current so as to dislodge and remove the loose fibers and coagulated ink residues off the adhesive surface of the support, or adhesive conveyor belt.

Alternatively, contacting the adhesive surface of the support with the cleaning composition may be effected by dipping, rolling and the likes.

The cleaning step may continue, according to some embodiments of the present invention, with wiping the adhesive surface of the support by mechanical means, e.g., a squeegee, a blow dryer, a drying roller or any other means for substantially removing and drying the adhesive surface of the support and prepare it for the next cycle of affixing the substrate thereon.

During the continuous printing step, the cleaning composition absorbs the loose fibers, the oily residues and coagulated ink residues, and its pH level gradually drops due to the addition of these residues. Hence, according to some embodiments of the present invention, the process further includes a pH monitoring step which takes place either continuously or periodically throughout the printing process.

According to some embodiments of the present invention, the pH level of the cleaning composition is maintained within predetermined pH limits, as presented hereinabove, by adding aliquots of a concentrated basic solution into the container which holds the cleaning composition in the printing system. This pH readjusting step may be carried out manually, semi-automatically or automatically, as discussed herein.

In parallel to the pH monitoring of the cleaning composition, the substrate is monitored for staining by the cleaning composition which eventually remained on the conveyor belt even after the mechanical means for removing excess cleaning composition therefrom. In case the substrate shows first signs of staining, the printing process is stopped, the system is emptied of the spent cleaning composition and washed off the fibers and ink residues accumulated in the system before a fresh cleaning composition is loaded and the printing process resumes.

Cleaning Composition:

According to an aspect of some embodiment of the present invention, a cleaning composition which can be effectively used to remove droplets or a film of the coagulated ink composition from a surface of an object, is utilized.

According to some embodiments of the present invention, the surface is an adhesive surface. According to some embodiments of the present invention, the object is an adhesive support usable in a printing system, e.g., as described herein.

According to some embodiments of this aspect of embodiments of the present invention, the cleaning composition is characterized by a basic pH level. More specifically, the pH of a cleaning composition as described herein, according to some embodiments, is higher than 7.5. Alternatively, the pH of the cleaning solution is higher than 8, 8.5, 9, 9.5 or higher than 10, or ranges from 7.5 to 11, and further alternatively, the pH of the cleaning solution ranges from 8.5 to 10.

In some embodiments of the invention, the cleaning composition is substantially devoid of hydroxide ions, and the basicity is achieved by weaker base substances, such as organic bases. It is noted that although hydroxide bases may serve the purpose of cleaning the adhesive surface of an adhesive blanket effectively, at some concentrations hydroxide ions may stain the substrate and may further be harmful to some of the elements of the printing system and/or the environment, and be hazardous to the operators of the system. By "substantially devoid of hydroxide ions", it is meant that the concentration of hydroxide ions ($OH^-$) in the final cleaning composition, according to some embodiments of the present invention, is less than 0.2% by weight of the total weight of the cleaning composition (wt. %). Alternatively, the cleaning composition comprises hydroxide ions at a concentration of less than 0.15 wt. %, less than 0.1 wt. %, less than 0.05 wt. %, or less than 0.01 wt. %. For example, if a concentrated stock solution of the cleaning composition comprises 0.015 wt. % hydroxide ions, and it is diluted 3 to 100 parts (3%) with water, the final concentration of hydroxide ions in the final cleaning composition is 0.045 wt. %.

According to some embodiments, the base substance, which is used to set a relatively high pH in the cleaning composition, is a non-volatile base substance. In some embodiments, ammonia and other nitrogen-based organic bases which in potential can be used as an effective base substance, are not included in the base substance. Such compounds are characterized by an offensive odor, high volatility, and may be hazardous to the environment, operators and mechanical elements of the system. In some embodiments of the present invention, the cleaning composition is devoid of volatile base substances, such as, but limited to, ammonia, hydrazine, methylamine, ethylamine, diethylamine, triethylamine, isobutylamine, N,N-diisopropylethylamine, morpholine, piperazine, ethylenediamine and 1,4-diazabicyclo[2.2.2]octane.

Basicity of a base substance can be measured by "base number", which is the number of milligrams of potassium hydroxide equivalent to the amount of acid required to neutralize the basic groups present in one gram of the substance's sample. Hence, in order to use a minimal amount of the base substance, for saving and for reducing the amount of residues left in the system and on the substrate, the base substance used in the cleaning composition, according to some embodiments of the present invention, has a relatively high base number.

According to some embodiments, the basic pH of the cleaning composition is achieved by using a basic buffer solution containing a base substance, which has a capacity to maintain the pH nearly constant across a range of working conditions. The use of a buffer solution in the printing process presented herein allows a cleaning solution comprising the same to be effective over an extended period of time, namely to maintain a pH level within the effective range.

Exemplary buffer reagents which are useful in the context of embodiments of the present invention include, without limitation, AMPD (2-amino-methyl-1,3-propanediol), bicine (2-(bis(2-hydroxyethyl)amino)acetic acid), borate/boric acid (pK1), CAPS (N-cyclohexyl-3-aminopropanesulfonic acid), CAPSO (N-cyclohexyl-2-hydroxyl-3-amino-propanesulfonic acid), carbonate (pK2), CHES (N-cyclohexyl-2-aminoethanesulfonic acid), EDTA (ethylenediaminetetraacetic acid), glycine (pK2), glycylglycine (diglycine), TAPS (3-[[1,3-dihydroxy-2-(hydroxymethyl) propan-2-yl]amino]propane-1-sulfonic acid), taurine (2-aminoethanesulfonic acid; AES), TBE (Tris/Borate/EDTA), Tris (2-Amino-2-hydroxymethyl-propane-1,3-diol), and any combination thereof.

According to some embodiments, the buffer used to maintain a basic pH in the cleaning composition comprises EDTA. In some embodiments, the basic pH is obtained with tetrasodion EDTA, which is balance with disodium calcium EDTA to a buffer solution form which has an effective buffering range of 8.5 to 10.

The concentration of the buffer agents depends on the working temperature, the type of the buffer agent, the solvent and additional solutes therein. In general, the concentration of the buffer agent ranges from 7 mM to 12 mM (referring to the organic portion of the buffer agent in case of, e.g., EDTA). It is noted that when the cleaning composition is used in a system configured for replenishing and/or readjusting the pH thereof, the concentration of the buffer agent may rise overtime due to continuous addition of a concentrated basic stock solution or components thereof during the pH adjustment process.

Additional agents which can be used in the cleaning composition described herein include, without limitation, builders, water softeners, chelating agents and a hardness-sequestering agents (0.1-5%, or 0.1-2%, or 0.5-1 or 0.1-0.7%, or 0.2-0.5%), anionic surfactants (0.1-10%, or 1.5-5%), non-ionic surfactants (0.1-10%, or 1-7%), wetting agents (0.05-0.15%), thickeners, anti-foaming agents (0.002-0.2%), disinfecting agents (0.5-1.0%), fungicides (0.5-0.8%), bactericides (0.5-0.8%), and the likes. Unless stated otherwise, all concentrations expressed in percent refer to the amount of the ingredient in terms of weight percent of the total weight of the composition.

In some embodiments, chelating agents or hardness-sequestering agents, also referred to herein as builders or water softeners, can be used in the cleaning composition. Some chelating agents, which are useful in the context of the cleaning composition provided herein, can also serve as buffering agents, such as, but not limited to EDTA. Examples of hardness-sequestering agents include aminocarboxylic acid base products, phosphates and phosphonates, hydroxy carboxylates, polyacrylates and sugar acrylates.

Examples of aminolycarboxylates include EDTA, nitrilotriacetic acid (NTA) and diethylene triamine pentaacetic acid (DTPA).

Phosphates and phosphonates sequestering agents can typically be used also as buffering agents, and are typically divided in two classes: inorganic polyphosphates such as sodium hexameta phosphate (SHMP), sodium polyphosphate, sodium tripolyphosphate, sodium trimeta phosphate, sodium pyrophosphates, and phosphonated aminopolycarboxylates such as EDTMP, DETMP, ATMP, HEDP and DTPMP. Phosphates of aminopolycarboxylic acids or phosphonates are derivatives of phosphorous acid and are characterised by exhibiting more features than mere chelation, such as inhibition of precipitation, corrosion inhibition, resistance to hydrolysis, deflocculation, colloidal suspensions stabilization.

Examples of salts of hydroxy carboxylic acids or hydroxy carboxylates, which can also be used as buffering agents, include citrate, tartarate, gluconate and oxalate. These organic compounds often have the property of preventing precipitation of bi and trivalent metal cation is in an alkaline medium.

Surfactants are useful in the context of some embodiments of the present invention, particularly to clean the adhesive surface from oily residues and other substances originating in the process of manufacturing some fabrics. Surfactants may act also as buffering agents, detergents, wetting agents, emulsifiers and dispersants. Surfactants are divided into anionic, non-ionic and cationic surfactants.

In the context of some embodiments of the present invention, the surfactant is an anionic surfactant. Most anionic surfactants can be broadly described as the water-soluble salts, particularly the alkaline earth metal, ammonium and amine salts, of organic sulfuric reaction products having in their molecular structure an alkyl radical containing from about 8 to about 22 carbon atoms and a radical selected from the group consisting of sulfonic acid and sulfuric acid ester radicals. Included in the term alkyl is the alkyl portion of acyl radicals. Examples of the anionic synthetic surfactants which can be used as the surfactant component in the cleaning compositions, according to some embodiments of the present invention, are the ammonium, or magnesium alkyl sulfates, especially those obtained by sulfating the higher alcohols ($C_8$-$C_{18}$ carbon atoms); magnesium alkyl benzene or alkyl toluene sulfonates, in which the alkyl group contains from about 9 to about 15 carbon atoms, the alkyl radical being either a straight or branched sodium and potassium sulfates can be incorporated; sodium or magnesium paraffin sulfonates and olefin sulfonates in which the alkyl or alkenyl group contains from about 10 to about 20 carbon atoms; sodium $C_{10-20}$ alkyl glyceryl ether sulfonates, especially those ethers of alcohols derived from tallow and coconut oil; sodium coconut oil fatty acid monoglyceride sulfates and sulfonates; sodium, ammonium or magnesium salts of alkyl phenol ethylene oxide ether sulfates with about 1 to about 30 units of ethylene oxide per molecule and in which the alkyl radicals contain from 8 to about 12 carbon atoms; the reaction products of fatty acids esterified with isethionic acid and neutralized with suitable base where, for example, the fatty acids are derived from coconut oil; sodium or potassium salts of fatty acid amides of a methyl tauride in which the fatty acids, for example, are derived from coconut oil and sodium or potassium beta-acetoxy- or beta-acetamido-alkanesulfonates where the alkane has from 8 to 22 carbon atoms. It is noted herein that when using anionic surfactants from various sources, care should be taken to avoid production of alkali bases, as those may stain/burn the fabric.

Examples of alkyl sulfate salts, which can be employed in the cleaning composition, according to some embodiments of the present invention, include sodium lauryl alkyl sulfate, sodium palmityl alkyl sulfate, sodium decyl sulfate, sodium myristyl alkyl sulfate, potassium lauryl alkyl sulfate, potassium decyl sulfate, potassium palmityl alkyl sulfate, potassium myristyl alkyl sulfate, sodium dodecyl sulfate, magnesium dodecyl sulfate, sodium coconut alkyl sulfate, potassium coconut alkyl sulfate, magnesium $C_{12-15}$ alkyl sulfate and mixtures of these surfactants. Preferred alkyl sulfates include sodium $C_{12-15}$ alkyl sulfate and magnesium $C_{12-15}$ alkyl sulfate.

Examples of alkylbenzene or alkyltoluene sulfonates, which can be employed as surfactants in the cleaning composition, according to some embodiments of the present invention, include the alkaline earth (calcium, magnesium) ammonium and alkanolamine salts of straight- or branched-chain alkylbenzene or alkyltoluene sulfonic acids. Alkylbenzene sulfonic acids useful as precursors for these surfactants include decyl benzene sulfonic acid, undecyl benzene sulfonic acid, dodecyl benzene sulfonic acid, tridecyl benzene sulfonic acid, tetrapropylene benzene sulfonic acid and mixtures thereof. Preferred sulfonic acids as precursors of the alkyl-benzene sulfonates useful for compositions herein are those in which the alkyl chain is linear and averages about 11 to 13 carbon atoms in length.

Examples of commercially available alkyl benzene sulfonic acids useful in the present invention include Conoco SA 515 and SA 597 marketed by the Continental Oil Company and Calsoft LAS 99 marketed by the Pilot Chemical Company.

Preferred anionic surfactants, which can be employed in the cleaning composition, according to some embodiments of the present invention, include alkyl ether sulfates having the formula $RO(C_2H_4O)_nSO_3M$ wherein R is alkyl or alkenyl of about 10 to about 20 carbon atoms, n is an integer ranging from 1 to 30, and M is a water-soluble cation. The alkyl ether sulfates useful as surfactants in the cleaning composition, according to some embodiments of the present invention, are condensation products of ethylene oxide and monohydric alcohols having from about 10 to about 20 carbon atoms. Preferably, R has 10-16 carbon atoms. The alcohols can be derived from natural fats. e.g., coconut oil or tallow, or can be synthetic. Such alcohols are reacted with 1 to 30, and especially 1 to 12, molar proportions of ethylene oxide and the resulting mixture of molecular species is sulfated and neutralized.

Examples of alkyl ether sulfates, which can be employed as surfactants in the cleaning composition, according to some embodiments of the present invention, include sodium coconut alkyl triethylene glycol ether sulfate, magnesium $C_{12-15}$ alkyl triethylene glycol ether sulfate, and sodium tallow alkyl hexaoxy ethylene sulfate. Preferred alkyl ether sulfates are those comprising a mixture of individual compounds, said mixture having an average alkyl chain length of from about 12 to 16 carbon atoms and an average degree of ethoxylation of from about 1 to 12 moles of ethylene oxide.

Additional examples of anionic surfactants, which can be employed as surfactants in the cleaning composition, according to some embodiments of the present invention, include compounds that contain two anionic functional groups. These are referred to as di-anionic surfactants. Suitable dianionic surfactants are the disulfonates, disulfates, or mixtures thereof which may be represented by the following formulae $R(SO_3)_2M_2$, $R(SO_4)_2 M_2$, $R(SO_3)(SO_4) M_2$, wherein R is an aliphatic hydrocarbyl group having 10-30 carbon atoms and M is a water-soluble cation. For example, the $C_{15}$ to $C_{20}$ disodium 1,2-alkyldisulfates, $C_{15}$ to $C_{20}$ dipotassium 1,2-alkyldisulfonates or disulfates, disodium, 1,9-hexadecyl disulfates. $C_{15}$ to $C_{20}$ disodium 1,2-alkyldisulfonates, disodium, 1,9-stearyldisulfates and 6,10-octadecyldisulfates.

Non-ionic surfactants are also contemplated in some embodiments of the present invention, as an additive of the cleaning composition provided herein. Prominent among these are fatty alcohols, cetyl alcohol, stearyl alcohol, and cetostearyl alcohol (consisting predominantly of cetyl and stearyl alcohols), and oleyl alcohol, and amides and esters of such fatty alcohols.

Examples of non-ionic surfactants include amine-based surfactants, polyoxyethylene glycol alkyl ethers such as octaethylene glycol monododecyl ether and pentaethylene glycol monododecyl ether; polyoxypropylene glycol alkyl ethers; glucoside alkyl ethers such as decyl glucoside, lauryl glucoside and octyl glucoside; polyoxyethylene glycol octylphenol ethers such as Triton X-100 and Triton H-66; polyoxyethylene glycol alkylphenol ethers such as Nonoxynol-9; Glycerol alkyl esters such as glyceryl laurate; polyoxyethylene glycol sorbitan alkyl esters such as polysorbate; sorbitan alkyl esters such as spans; cocamide MEA, cocamide DEA; dodecyldimethylamine oxide; block copolymers of polyethylene glycol and polypropylene glycol such as poloxamers; and polyethoxylated tallow amine (POEA).

The amide-based (non-ionic) surfactants, which can be employed in the cleaning composition, according to some embodiments of the present invention, can be represented by the general formula: $R_1C=ON(H)_n(R_2OH)_{2-n}$ wherein $R_1$ is an aliphatic hydrocarbon radical having from about 5 to about 30 carbon atoms, $R_2$ is an aliphatic hydrocarbon radical having 1 to 6 carbon atoms and n is zero, 1 or 2. Preferred amide surfactants, according to some embodiments of the present invention include the monoethanol amides of $C_{10-16}$ fatty acids.

Examples of anti-foaming agents include, but are not limited to silicone-based anti-foaming agents, silicone-glycol emulsion anti-foaming agents, polyalkylsiloxane anti-foaming agents and the like. Such anti-foaming are readily available from commercial suppliers. The anti-foaming agents should be soluble or dilutable in an aqueous phase. The anti-foaming agents can be provided as fluids, compounds, for example, silicone fluids containing a suspension of finely powdered silica or emulsions. Emulsions are preferred for applications in which water is the predominant phase. Examples of anti-foaming agents within the scope of the present invention are also disclosed in U.S. Pat. No. 5,556,902, which is incorporated herein by reference.

An example of an anti-foaming agent which can be used in the context of some embodiments of the present invention, is Dow Corning® Antifoam 2210 ("2210"). 2210 is a silicone-glycol emulsion, comprising 90% water, 6% polypropylene glycol and 2% polydimethylsiloxane. The active ingredient of 2210 provided at 10% of the composition. 2210 has a specific gravity of 1.0 at 25 Degrees C. and a consistency of 2,500 cp at 25° C. The 2210 emulsifier is nonionic and the pH is 7.0. In addition. Dow Corning® Antifoam 1920 is within the scope of the present invention.

The anti-foaming agent is preferably present in a final concentration in an amount from about 0.01% to about 1%. Alternatively, the anti-foaming agent is present in a final concentration in an amount from about 0.03% to about 0.7%. Alternatively, the anti-foaming agent is present in a final concentration in an amount from about 0.05% to about 0.8%.

Commercially Available Formulations for Use in Cleaning Compositions:

Commercial detergent formulations that can be used as part of the cleaning composition provided herein, include formulations used in the metal cleaning industry. Non-limiting examples of concentrated detergents from the metal cleaning industry, include Alkaline Metal Cleaner: Premium Concentrate M-200, Alkaline Metal Cleaner: Standard Concentrate M-201, Heavy Oil Metal Cleaner M-202 Low-Foam, Metal Cleaner LF-114 Low-Foam, Easy Rinse Metal Cleaner M-300 Flash-Foaming, Metal Cleaner M-301 Low-Residue, Metal Cleaner M-302 Metal Parts Degreaser M-303, all available via Air Products and Chemicals, Inc., USA.

Commercially available formulations, which are useful in the context of the cleaning composition, according to some embodiments of the present invention, can be used after dilution with water (typically 3:100 dilution, or 3 wt. % in water). Alternatively, such commercially available formulations can be diluted and adjusted for use by pH adjustment and/or the addition of some other ingredients, such as anti-foaming agents, a bactericide and a fungicide (antimicrobial agents) and the like.

An example of a commercially available metal cleaning detergent formulation M-200 by Air Products and Chemicals, Inc., include:

| | |
|---|---|
| Tomadol 91-6 or Tomadol 900 surfactant, | 10.0 wt. %; |
| Sodium metasilicate, pentahydrate, | 7.0 wt. %; |
| Trisodium phosphate, anhydrous, | 2.0 wt. %; |
| Sodium hydroxide (50%), | 3.0 wt. % (1.5 wt. % HO⁻ ions); |
| Ethylenediamine tetraacetic acid, tetrasodium salt, | 6.0 wt. %; |
| Triton H-66, | 5.0 wt. %; |
| Water, | 67.0 wt. %; and |
| pH | 12.7. |

An example of a commercially available metal cleaning detergent formulation M-202 by Air Products and Chemicals, Inc., include:

| | |
|---|---|
| Sodium metasilicate, pentahydrate, | 7.0 wt. %; |
| Ethylenediamine tetraacetic acid, tetrasodium salt, | 6.0 wt. %; |
| Tomadol 91-6 surfactant, | 3.0 wt. %; |
| Tomadol 91-2.5 surfactant, | 7.0 wt. %; |
| Tomamine Amphoteric 400 surfactant, | 8.0 wt. %; |
| Water, | 69.0 wt. %; and |
| pH | 13.5. |

An example of a commercially available metal cleaning detergent formulation LF-114 by Air Products and Chemicals, Inc., include:

| | |
|---|---|
| Tetrapotassium pyrophosphate, | 6.0 wt. %; |
| Potassium hydroxide (45 wt. %), | 12.0 wt. % (5.4 wt. % HO⁻ ions); |
| Potassium silicate, | 12.0 wt. %; |
| Tomamine AO-405 surfactant, | 2.0 wt. %; or |
| Tomamine AO-455 surfactant, | 2.0 wt. %; |
| Tomamine Amphoteric 400 surfactant, | 1.8 wt. %; or 2.7 wt. %; |
| Water, | 66.2 wt. %; or 65.3 wt. %; and |
| pH | 13.7. |

Another example of a commercially available metal cleaning detergent formulation M-300 by Air Products and Chemicals, Inc., include:

| | |
|---|---|
| EDTA tetrasodium salt, | 1.0 wt. %; |
| Tomamine AO-405 surfactant, | 2.0 wt. %; |
| Tomamine Amphoteric 400 surfactant, | 2.0 wt. %; |
| Tomamine E-14-5 surfactant, | 1.5 wt. %; and |
| Water | 93.5 wt. %. |

It is noted that any embodiment of the above-mentioned composition, are suitable in combination with any one of the embodiments pertaining to the process and/or the system described herein.

Concentrated Basic Stock Solution:

As discussed hereinbelow, the pH of the cleaning composition tends to decrease during extended operation of the printing machine due to the accumulation of coagulated ink residue. In some embodiments of the invention, during extended and continuous use of the printing system, the effective pH of the cleaning composition is readjusted and maintained, either manually, semi-automatically or automatically, by adding predetermined aliquots (portions of a total amount of a solution) of a concentrated base or basic stock solution at a concentration which is higher than the minimal concentration of the buffer agent(s) in the cleaning composition.

For example, in embodiments wherein the cleaning composition comprises EDTA as a buffering agent (0.2 M of tetrasodium EDTA and 0.1 M of disodium calcium EDTA at a pH of 9.5-10), the concentrated basic stock solution comprises tetrasodium EDTA at a concentration of that ranges from 0.2 to 1 M. When the pH of the cleaning composition drops below pH of 8.5, about 10 to 2000 ml of this concentrated basic stock solution are added to a reservoir containing about 1 to 100 liters of the cleaning composition in order to readjust its pH during operation of the printing system.

For another example, in embodiments wherein the cleaning composition comprises a commercially available detergent-containing formulation, the product is diluted with water according to the manufacturer instructions, additional ingredients are added according to some embodiments of the invention, such as anti-foaming and antimicrobial agents, the pH is tested and adjusted to a pH above 7.5, and the cleaning composition is then monitored during the use of the printing machine for pH. When the pH of the cleaning composition drops below pH of 8.5, about 1 to 2000 ml of a concentrated basic stock solution are added to a reservoir containing about 1 to 100 liters of the cleaning composition in order to readjust its pH during operation of the printing system.

System:

According to some embodiments of the present invention, the printing system is equipped with sensors that indicate and signal when wrinkles or any other obstacles, that can harm the printheads, are detected thereby. Such sensors are also useful in determining the effectiveness of the method of cleaning the adhesive surface, according to some embodiments of the invention. Such sensors can be used, for example, to determine if a periodic treatment of the adhesive surface, as discussed hereinabove, is necessary.

Referring now to the drawings, FIG. 1 illustrates an exemplary printing system 10, according to some embodiments of the present invention. System 10 can include a printing unit 11, being configured to apply a coagulating ink composition on a substrate 13 and positioned in proximity to an adhesive conveyor belt 12 which is configured to support and move substrate 13 by means of tension and motion rolls 14. In some embodiments of the present invention, the exterior surface of adhesive conveyor belt 12 which comes in contact with substrate 13 is coated in an adhesive polymeric composition (not shown).

In various exemplary embodiments of the invention, printing unit 11 further includes at least one nozzle configured for applying a first part of the ink composition and at least one second nozzle for applying a second part of the ink composition. According to some embodiments, the first nozzle and the second nozzle are configured to apply a first part and a second part of the ink composition respectively. According to some embodiments, the first nozzle and the second nozzle are each inkjet printheads, or at least the second nozzle is an inkjet printhead.

In the representative illustration of FIG. 1, system 10 is configured such that substrate 13 is conveyed from an unwind roll 15 to a rewind roll 16; however, it is to be understood that it is not intended to limit the scope of the present invention to any particular configuration and that system 10 may further include any number of additional substrate manipulating elements, such as tension rolls, substrate spreading and stretching elements and the likes. It is also to be understood that printing unit 11 can encompass any number of sub-systems and elements which are configured to apply and cure a coagulating ink composition onto substrate 13.

In some embodiments of the present invention, the adhesive surface of adhesive conveyor belt 12 is brought in contact with a cleaning composition 17 so as to remove loose fibers and coagulated ink residues from the layer of adhesive polymeric composition (not shown) present on the surface of adhesive conveyor belt 12. In some embodiments of the present invention, cleaning composition 17 is contained in a basin 18, and in some embodiments, cleaning composition 17 is brought in contact with adhesive conveyor belt 12 by means of e.g., a cleaning brush 19 that extends the width of adhesive conveyor belt 12, and positioned inside basin 18 so as to come in contact with cleaning composition 17 and adhesive conveyor belt 12 simultaneously. It is to be understood that cleaning composition 17 can be brought in contact with the adhesive surface of adhesive conveyor belt 12 by other liquid application means such as spraying, dipping and the likes.

In various exemplary embodiments of the invention, system 10 may further comprise a squeegee 20 and/or a dryer 21 (e.g., an air knife, a hydrophilic adsorbing material and the likes), which are positions and configured to remove excess cleaning composition 17 from adhesive conveyor belt 12. In some embodiments, this excess of cleaning composition 17 may be collected and removed or replaced in basin 18.

In various exemplary embodiments of the invention, system 10 comprises a composition reservoir 22 for containing cleaning composition 17, which is in fluid communication with basin 18 via a circulator 23 and a circulating tubing 24. In such exemplary configuration, the large amount of cleaning composition 17 enables system to operate continuously over extended periods of time before cleaning composition 17 is spent and requires replacement. In some embodiments, composition reservoir 22 is used also to trap and remove solid debris and other sediments from cleaning composition 17.

In various exemplary embodiments of the invention, system 10 comprises a pH controller 25 which is configured for sensing the pH level of cleaning composition 17 in basin 18. In other various exemplary embodiments of system 10 which do not include a reservoir, pH controller 25 may be in contact with cleaning composition 17 in composition reservoir 22. In embodiments where pH controller 25 is used, the pH level of cleaning composition 17 is monitored continuously or periodically to verify that the pH is within predetermined limits that constitute the effective pH level for cleaning the adhesive layer on adhesive conveyor belt 12, and to execute an action when the pH level limits are surpasses or underpasses.

In some embodiments, the automatic action executed by pH controller 25 is an alarm that alerts the operator of system 10 with regards to the pH level of cleaning composition 17.

In some embodiments, the automatic action executed by pH controller 25 is actuating a flow of a controlled amount of a basic stock solution, which is kept in a buffer reservoir 26, via a buffer tubing 27, into composition reservoir 22. The basic stock solution is transferred into composition reservoir 22 while pH controller 25 is monitoring the pH level until the pH level is within the predetermined limits. In some embodiments, pH controller 25 is configured to alert the operator when buffer reservoir 26 is close to empty and/or when the pH level of cleaning composition 17 in composition reservoir 22 can no longer be adjusted to the predetermined limits by the basic stock solution. It is noted that in some embodiments system 10 does not comprise composition reservoir 22, and pH controller 25 and buffer reservoir 26 are in fluid communication with basin 18, which is used for monitoring the pH level of cleaning composition 17, and adjusting its pH therein.

It is to be understood that the adhesive conveyor belt cleaning mechanism of the printing system may comprise other parts and elements which are intended to control the flow of the cleaning composition, and the position of the mentioned parts and elements (for example, a mechanism that lifts basin 18 towards the downwards facing surface of adhesive conveyor belt 12); hence some motors, shafts, pistons, valves, pumps, screens, meshes, strainers, filters, drains, taps, tubing and the likes, which are not shown in FIG. 1, may be incorporated and used in the system.

It is expected that during the life of a patent maturing from this application many relevant metallic particles-containing thermoplastic compositions will be developed, and the scope of the term metallic particles-containing thermoplastic composition is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

A Kornit Allegro printer, equipped with a high precision adhesive belt conveyor system, receives fabric from a roll on the input and rewinds the material back onto a roll when complete (roll-to-roll). The fabric may enter the printer without being stretched or otherwise dimensionally unstable. The Kornit Allegro printer is typically equipped with sensors that warn if they detect wrinkles or any other obstacle that may harm the printheads. The printer advances the fabric beneath the printheads after each pass of the printer's carriage. Accuracy is essential to achieving good print quality by reducing the probability for dot placement errors. The motion control system for movement of the conveying belt and fabric is required to be accurate to the sub-pixel level. For example, at 540 dots per inch, position accuracy needs to be better than about 12 microns.

The fabric position is controlled by a belt that has a sticky surface, referred to herein as an adhesive print blanket, sticky belt etc., which keeps the fabric dimensionally stable during printing. As the fabric is placed on the belt it cannot be stretched or have wrinkles. A mechanism unwinds the fabric roll and keeps as little tension as possible on the fabric. This is especially important when printing stretchy fabrics such as Lycra™ (which is used for swimsuits and other sportswear) otherwise the image could be distorted after coming off the printer. The feed mechanism gently lays the fabric on the sticky belt after it goes over a de-wrinkling roller. The fabric is then pressed to the surface of the belt by a pressure roller prior to entering the print area. After being printed, the fabric is dried by passing over a heated platen in or a hot air oven. The heater dries the fabric, and typically cures the inks, so it can be rewound onto a roll without any ink transfer from the image (not necessarily intended to cure the ink). The fabric is then rewound onto a roll that is tension controlled to reduce stretching. The adhesive print blanket is cleaned continuously by a brush soaked with a cleaning composition, according to some embodiments of the present invention, to remove residual ink, oily residues and fibers so as to refresh the stickiness of the surface of the blanket, and dried with a squeegee prior to receiving more fabric from the input roll.

Exemplary Cleaning Composition Formulation:
Table 2 provides an example of a cleaning composition, according to some embodiments of the present invention, comprising EDTA as a basic buffer agent.

TABLE 2

| Material | Function | Concentration | Amount to form 1 liter |
|---|---|---|---|
| Tetrasodium EDTA | A base | 5 mM | 1.8 g |
| Disodium/calcium EDTA | A protonated form of the base (a weak acid) | 2.5 mm | 1 g |
| Foamex 810 ex Tego | An anti-foaming agent | 0.15% w/v | 15 g |
| Acticide OTA 20 | A fungicide | 0.4% w/v | 4 g |
| BYK 3401 | A wetting agent | 0.1% w/v | 1 g |
| Water | A carrier | — | Up to 1 liter |

Exemplary Basic Stock Solution:
An exemplary basic stock solution which can be used to readjust the pH of the above cleaning composition, according to some embodiments of the present invention, comprise tetrasodium EDTA as a base as a concentration of 0.4 M.

Example 2

As discussed hereinabove, some commercially available metal cleaning detergent formulations have been found useful in the context of some embodiments of the present invention. For example, the metal cleaning detergent formulation M-300, provided by Air Products and Chemicals, Inc, which includes:

| | | |
|---|---|---|
| EDTA, tetrasodium salt | Buffer agent | 1.0 wt. %; |
| Tomamine AO-405 | Amine-based non-ionic surfactant | 2.0 wt. %; |
| Tomamine Amphoteric 400 | Amine-based non-ionic surfactant | 2.0 wt. %; |
| Tomamine E-14-5 | Amine-based non-ionic surfactant | 1.5 wt. %; |
| Water | | 93.5 wt. %; and |
| pH | Adjusted with various salts of EDTA | at least 7.5 | can be used as is. Optionally, the commercially available M-300 formulation may be modified by adding an anti-foaming agent thereto. Further, optionally, a disinfecting agent, and/or a fungicide and/or a bactericide can be added thereto.

During extended operation of the printing system, or when the pH of the cleaning composition drops below 7.5, the pH is adjusted using a basic stock solution, such as 0.4 M tetrasodium EDTA.

Example 3

A concentrated commercially available metal cleaning formulation, M-200 (Air Products and Chemicals Inc.), has been used to form a cleaning composition, according to some embodiments of the present invention. M-200 is a concentrated detergent having a pH of 12.7, which includes:

| | |
|---|---|
| Tomadol 91-6 or Tomadol 900 nonionic surfactant, | 10.0 wt. %; |
| Sodium metasilicate, pentahydrate, | 7.0 wt. %; |
| Trisodium phosphate, anhydrous, | 2.0 wt. %; |
| Sodium hydroxide (50 wt. % stock), | 3.0 wt. %; |
| EDTA tetrasodium salt, | 6.0 wt. %; |
| Triton H-66, | 5.0 wt. %; |
| Water, | 67.0 wt. %; and |
| pH | 12.7. |

The concentrated commercial detergent formulation was diluted with water to reach a final concentration of 3 wt. %, and an anti-foaming agent was added thereto to a 0.4 wt. %. The pH of the final cleaning composition was about 12.

When the pH of the cleaning composition reached a minimum of 8.5, 1 wt. % of the concentrated commercial detergent formulation was added to the reservoir of the cleaning composition, while the printing system was in continuous use.

When the cleaning composition exhibited some foaming, a solution of 0.05% of the anti-foaming agent was added to the reservoir.

After a continuous printing task of about 5,000-10,000 linear meters of fabric, the printing system was stopped and the adhesive blanket was wiped with an aqueous solution of 5 wt. % of the concentrated commercial detergent formulation.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A process of inkjet printing an image on a substrate or a portion of a substrate, the process comprising:
    affixing the substrate or the portion of the substrate to an adhesive surface of a support;
    inkjet printing said image by directly applying an ink composition onto the substrate or on the portion of the substrate;
    separating said substrate from the adhesive surface; and
    without stopping the process, contacting said adhesive surface with an aqueous cleaning composition having a pH level of at least 7.5.

2. The process of claim 1, further comprising, upon said contacting:
    affixing another substrate or another portion of the substrate to said adhesive surface;
    inkjet printing said image by directly applying an ink composition onto the another substrate or another portion of the substrate;
    separating the another substrate or the another portion of the substrate from the adhesive surface; and
    without stopping the process, re-contacting said adhesive surface with an aqueous cleaning composition having a pH level of at least 7.5.

3. The process of claim 1, wherein said cleaning composition has a pH level of at least 8.5.

4. The process of claim 1, wherein said cleaning composition comprises a buffer agent.

5. The process of claim 1, wherein said cleaning composition further comprises an anionic surfactant.

6. The process of claim 1, wherein said cleaning composition further comprises a nonionic surfactant.

7. The process of claim 1, wherein said cleaning composition further comprises a hardness-sequestering agent.

8. The process of claim 1, further comprising, subsequent to said contacting, and/or to said re-contacting said adhesive surface with said cleaning composition, readjusting said pH level to at least 7.5.

9. The process of claim 1, effected using a printing system for direct printing the ink composition on the substrate or the portion of the substrate, said printing system comprising:
    a printing unit for applying said ink composition;
    a support for supporting said substrate, having said adhesive surface; and
    a means for contacting said cleaning composition with said adhesive surface.

10. The process of claim 9, wherein said printing unit comprises at least one first nozzle for applying a first part of said ink composition and at least one second nozzle for applying a second part of said ink composition, whereas said second part congeals upon contact with said first part when said first part and said second part converge on said substrate or said portion of the substrate.

11. The process of claim 9, wherein said means for contacting is selected from the group consisting of a brush, a spraying nozzle and a sponge.

12. The process of claim 9, wherein said system further comprises a basin for housing said means for contacting and/or for holding said cleaning composition.

13. The process of claim 9, wherein said system further comprises a pH controller for monitoring and/or readjusting said pH level of said cleaning composition.

14. The process of claim 9, wherein said system further comprises a buffer reservoir for holding a concentrated basic stock solution.

15. The process of claim 9, wherein said system further comprises a circulator for circulating said cleaning composition.

16. The process claim 9, wherein said system further comprises a composition reservoir for holding said cleaning composition.

* * * * *